United States Patent [19]
Protheroe

[11] Patent Number: 5,225,636
[45] Date of Patent: Jul. 6, 1993

[54] APPARATUS AND METHOD FOR DIGITIZER POINT SAMPLING AND VALIDATION

[75] Inventor: Robert L. Protheroe, Lawrenceville, Ga.

[73] Assignee: NCR Corporation, Dayton, Ohio

[21] Appl. No.: 838,984

[22] Filed: Feb. 21, 1992

[51] Int. Cl.[5] ............................................. G08C 21/00
[52] U.S. Cl. ........................................ 178/18; 178/19
[58] Field of Search ............................. 178/19, 18, 20

[56] References Cited

U.S. PATENT DOCUMENTS

| | | | |
|---|---|---|---|
| 4,575,580 | 3/1986 | Jandrell | 178/18 |
| 4,680,429 | 7/1987 | Murdock et al. | 178/19 |
| 4,819,194 | 4/1989 | Koizumi et al. | 364/556 |

*Primary Examiner*—Stafford Schreyer
*Attorney, Agent, or Firm*—Paul W. Martin

[57] ABSTRACT

An apparatus and method for digitizer sampled point validation which compares charge and discharge voltages across a capacitive element within the digitizer or a filter coupled between the digitizer and an analog-to-digital convertor to accept or reject the point. The method of the present invention detects excessive contact resistance, typically caused by insufficient actuation force. The method alternately charges and discharges the digitizer sampling circuitry to positive and negative voltage rails prior to readings. The sampling circuitry includes the layer in use, and the wire connections, all of which provide resistance and capacitance affecting the time constants for charging and discharging. The sampling circuitry also includes the filter in use, when so installed. High contact resistance due to excessive contact resistance prevents adequate charging and discharging of the sampling circuitry to the position voltage of the point and results in unequal values for the two readings. A comparison of the two values shows conclusively whether contact resistance is too high, and therefore whether the sample is valid.

18 Claims, 3 Drawing Sheets

APPARATUS AND METHOD FOR DIGITIZER POINT SAMPLING AND VALIDATION

CROSS REFERENCE TO RELATED APPLICATION

The present invention is related to commonly assigned and co-pending U.S. application entitled, "Apparatus and Method for Sampled Point Validation", invented by Protheroe et al. U.S. Pat. No. 836,683, still pending.

BACKGROUND OF THE INVENTION

The present invention relates to handwriting capture devices and more specifically to an apparatus and method for digitizer sampled point validation.

Pressure sensitive digitizers are devices used to record the position of a data input instrument, such as a pen or stylus, which is pressing on the surface of the digitizer. The digitizer includes two resistive layers which are normally separated, but which come in contact with each other when subjected to pressure from a data input instrument. Separator dots between the layers prevent contact between the layers except at the point of pressure.

Contact resistance between the resistive layers may create significant inaccuracies in point digitization. Contact resistance increases the charge time of any low pass filters coupled to the digitizer. Low pass filters are commonly used to provide protection against electrostatic discharge, noise immunity, and a stable input to an analog to digital converter which takes the position sample. If charge time is longer than the sample period of the digitizer, then the sample is invalid. This type of inaccurate sample point is herein known as a "spike" and the process which produces the inaccurate point is called "spiking".

Commonly employed techniques for overcoming invalid readings due to spiking include oversampling and distance threshold methods. During oversampling, the digitizer takes multiple readings per point and averages them. Disadvantageously, oversampling does not remove the inaccuracies; it merely dilutes them. Furthermore, oversampling reduces the point collection rate.

Using distance threshold methods, the digitizer rejects a point if it is too far from the previous point. However, the distance threshold method cannot filter invalid points that are within reasonable bounds of stylus velocity.

Therefore, it would be desirable to provide an apparatus and method for preventing invalid sample points from being recorded.

SUMMARY OF THE INVENTION

In accordance with the teachings of the present invention, an apparatus and method for digitizer point sampling and validation is provided. The digitizer includes capacitive and resistive elements. The apparatus may include filter circuitry having resistive and capacitive elements for filtering signals from the digitizer, in addition to an analog drive circuit for driving the digitizer and for charging and discharging the capacitive element, a switch control logic for connecting the analog drive circuit to the digitizer through the switch control logic, an analog-to-digital convertor coupled to the filter circuitry for sensing the voltage at a predetermined number of electrodes, and a microcontroller coupled between the analog-to-digital convertor and the switch control logic for controlling the switch control logic, for determining the coordinates of a point of contact between the layers, and for comparing the charge and discharge voltages at predetermined electrodes to either accept or reject the point sample.

The method of the present invention detects excessive contact resistance, typically caused by insufficient actuation force. The method alternately charges and discharges the digitizer sampling circuitry to positive and negative voltage rails prior to readings. The sampling circuitry includes the layer in use, and the wire connections, all of which provide resistance and capacitance affecting the time constants for charging and discharging. The sampling circuitry also includes the filter in use, when so installed. High contact resistance due to excessive contact resistance prevents adequate charging and discharging of the sampling circuitry to the position voltage of the point and results in unequal values for the two readings. A comparison of the two values shows conclusively whether contact resistance is too high, and therefore whether the sample is valid.

It is accordingly an object of the present invention to provide an apparatus and method for digitizer point sampling and validation.

It is another object of the present invention to provide an apparatus and method for digitizer point sampling and validation which employs the capacitive and resistive elements of the digitizer or of a filter coupled between the digitizer and an analog-to-digital converter.

It is another object of the present invention to provide an apparatus and method for digitizer point sampling and validation which compares charge and discharge voltages to accept or reject a point.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
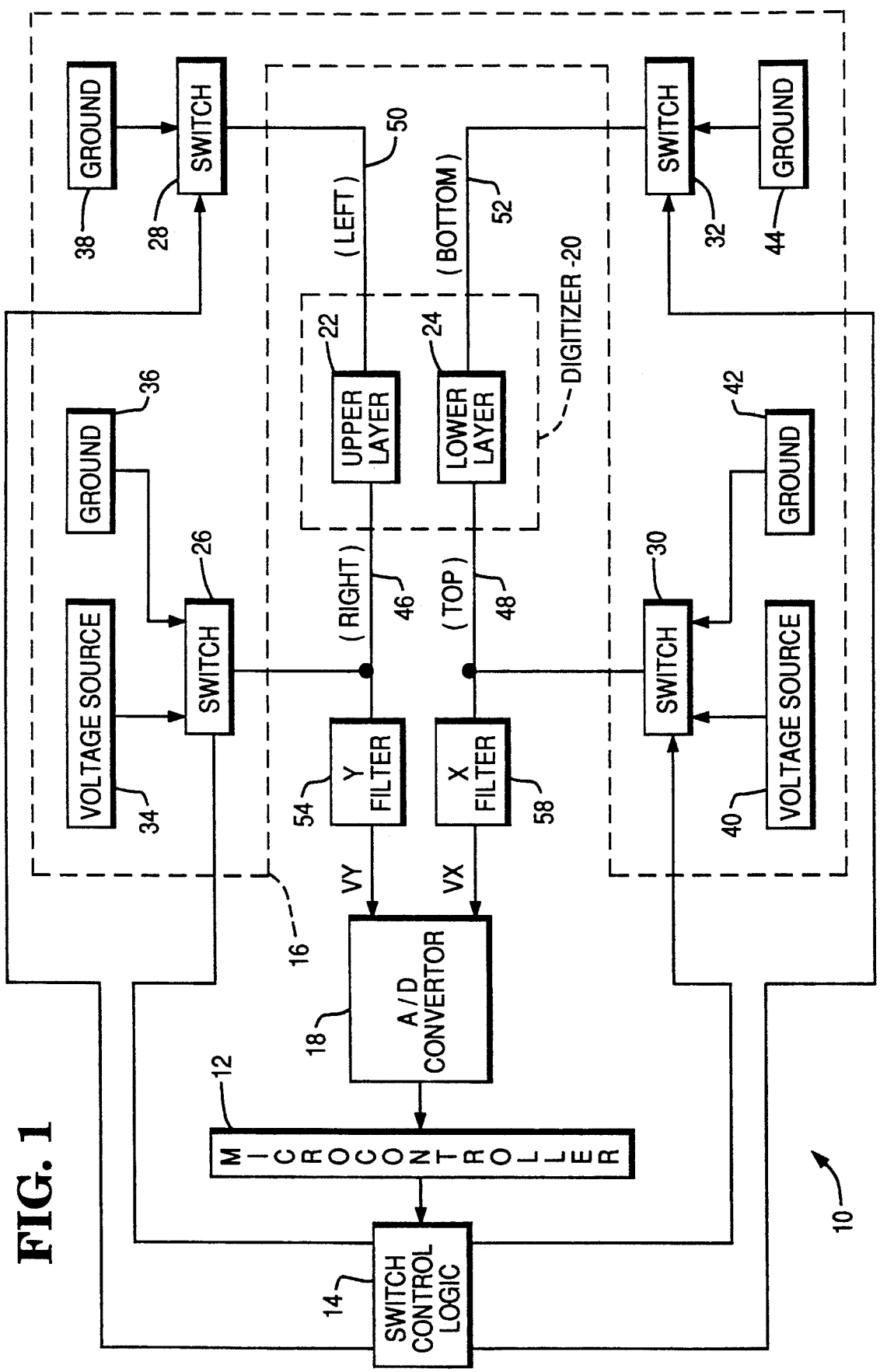
FIG. 1 is a block diagram of the apparatus of the present invention.

Referring now to FIG. 1, apparatus 10 of the present invention primarily includes microcontroller 12, switch control logic 14, analog drive circuit 16, analog-to-digital (A/D) convertor 18, and filter circuitry 19.

Microcontroller 12 controls the operation of apparatus 10. It includes a memory and a data buffer which receive inputs from digitizer 20, which are filtered by filter circuitry 19 and quantified by A/D convertor 18. It controls analog drive circuit 16 through switch control logic 14. It determines the position of points of contact between upper and lower layers 22 and 24 of digitizer 20, and determines the validity of position samples.

Switch control logic 14 controls the operation of analog drive circuit 16 in response to commands from microcontroller 12. Preferably, switch control logic 14 includes a latch which receives clock and command inputs from microcontroller 12. The latch may be one which is outside or inside microcontroller 12. If the latch is internally located, the microcontroller package must have enough port pins to implement apparatus 10. A discussion of latch circuits can be found in the book, "Microelectronics", by Jacob Millman, published by McGraw-Hill Book Co. in 1979.

Analog drive circuit 16 includes switches 26-32 and a plurality of digitizer inputs, including voltage sources 34 and 40, and grounds 36, 38, 42, and 44. Switches 26-32 are preferably transistor switching circuits. A discussion of such circuits can be found in the book, "Electronic Circuits and Applications", by Stephen D. Sentura and Bruce D. Wedlock, published by John Wiley & Sons in 1975.

A/D convertor 18 samples voltages Vx and Vy and converts them to digital code for use by micro-controller 12.

Digitizer 20 is preferably a four-wire resistive membrane digitizer, although the present invention envisions other types of digitizers, including five-wire digitizers. Digitizer 20 includes upper and lower layers 22 and 24. Each layer includes two parallel wire electrodes. Upper layer 22 includes left and right parallel electrodes 46 and 50, and lower layer 24 includes bottom and top parallel electrodes 48 and 52. Electrodes 46 and 50 run perpendicular to electrodes 48 and 52. Digitizer 20 contains resistive and capacitive elements.

If installed, filter circuitry 19 filters digitizer outputs and includes substantially identical y-filter 54 and x-filter 58. Filters 54 and 58 are typically low pass filter circuits known in the art and contain resistive and capacitive elements.

Figure 2:
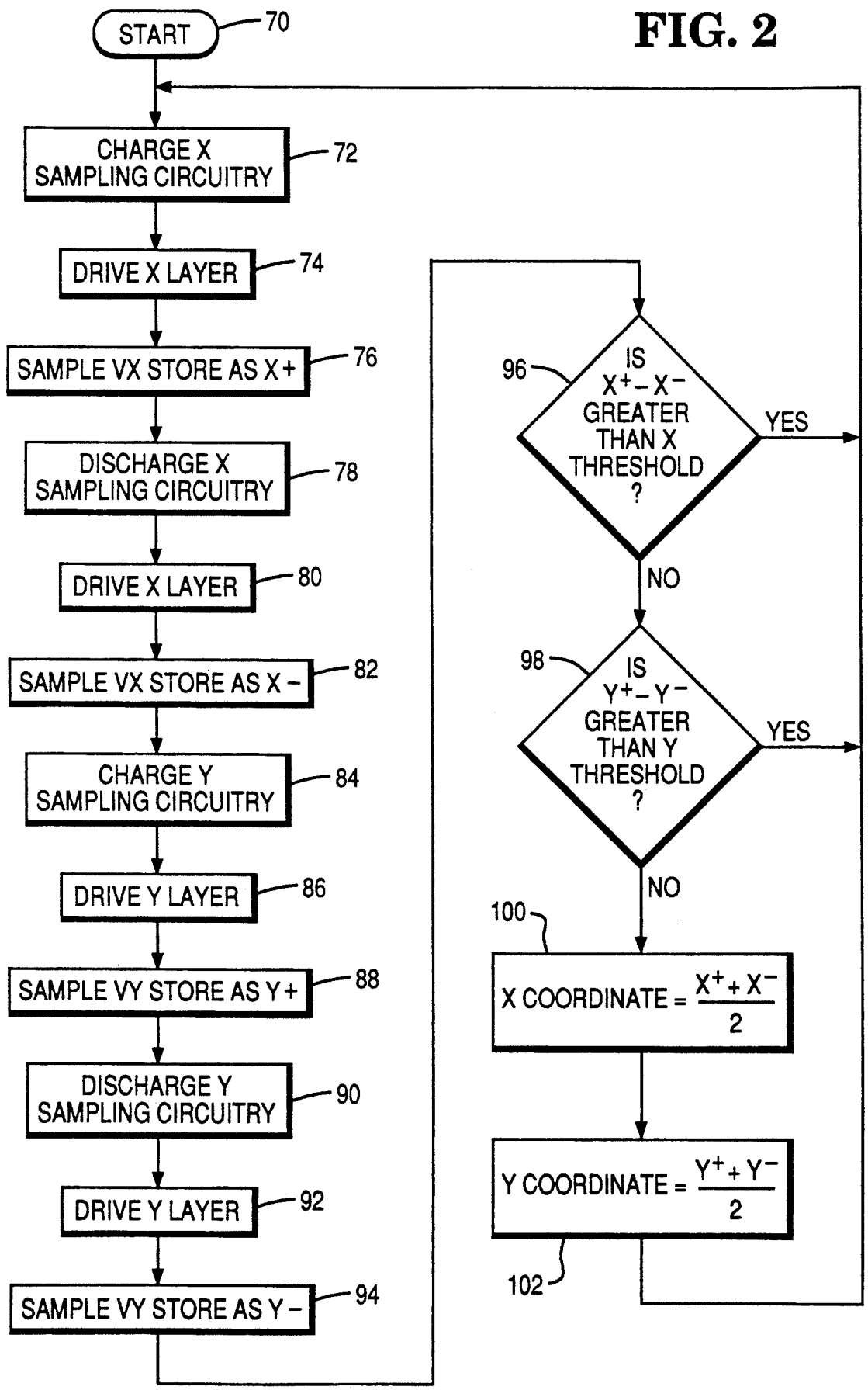
FIG. 2 is a flow diagram of the digitizer point sampling and validation method of the present invention.

Referring now to FIG. 2, a method for digitizer point sampling and validation is shown, beginning with START 70. The method determines the coordinates and validity of the point using the same steps. The method of the present invention detects excessive contact resistance, typically caused by insufficient actuation force. The method alternately charges and discharges the digitizer sampling circuitry to positive and negative voltage rails prior to readings. The sampling circuitry includes the layer in use, and the wire connections, all of which provide resistance and capacitance affecting the time constants for charging and discharging. The sampling circuitry also includes the filter in use, when so installed. High contact resistance due to insufficient actuation force prevents adequate charging and discharging of the sampling circuitry to the position voltage of the point and results in unequal values for the two readings. A comparison of the two values shows conclusively whether the contact resistance is too high and therefore whether the sample is valid.

In block 72, the x-sampling circuitry is charged to a positive voltage rail VR+, where the x-sampling circuitry primarily includes x-filter 58, lower layer 24 of digitizer 20, and wire connections from lower layer 24 to the x-input of A/D convertor 18. Microcontroller 12 signals switch control logic 14 to cause switch 30 to couple voltage source 40 to top electrode 48.

In block 74, upper layer 22 is driven. Microcontroller 12 signals switch control logic 14 to cause switch 26 to couple voltage source 34 to right electrode 46 and switch 28 to couple ground 38 to left electrode 50.

In block 76, A/D convertor 18 samples voltage Vx and microcontroller 12 stores the digital representation of voltage Vx as data value X+.

In block 78, the x-sampling circuitry is discharged to a negative voltage rail VR−. Microcontroller 12 signals switch control logic 14 to cause switch 30 to couple ground 42 to top electrode 48. Alternatively, microcontroller 12 could signal switch control logic 14 to cause switch 32 to couple ground 44 to bottom electrode 52. In this case, ground 42 is not needed. However, the time to discharge the sampling circuitry is extended as the lower layer resistance is in series between ground 44 and the x-sampling circuitry.

In block 80, upper layer 22 is driven. Microcontroller 12 signals switch control logic 14 to cause switch 26 to couple voltage source 34 to right electrode 46 and switch 28 to couple ground 38 to left electrode 50.

In block 82, A/D convertor 18 samples voltage Vx and microcontroller 12 stores voltage Vx as data value X−.

In block 84, the y-sampling circuitry is charged to the positive voltage rail, where the y-sampling circuitry primarily includes y-filter 54, upper layer 22 of digitizer 20, and wire connections from upper layer 22 to the y-input of A/D convertor 18. Microcontroller 12 signals switch control logic 14 to cause switch 26 to couple voltage source 34 to right electrode 46.

In block 86, lower layer 24 is driven. Microcontroller 12 signals switch control logic 14 to cause switch 30 to couple voltage source 40 to top electrode 48 and switch 32 to couple ground 44 to bottom electrode 52.

In block 88, A/D convertor 18 samples voltage Vy and microcontroller 12 stores the digital representation of voltage Vy as data value Y+.

In block 90, the y-sampling circuitry is discharged to the negative voltage rail. Microcontroller 12 signals switch control logic 14 to cause switch 26 to couple ground 36 to right electrode 46. Alternatively, microcontroller 12 could signal switch control logic 14 to cause switch 28 to couple ground 38 to left electrode 50. In this case, ground 36 is not needed. However, the time to discharge the sampling circuitry is extended as the upper layer resistance is in series between ground 38 and the y-sampling circuitry.

In block 92, lower layer 24 is driven. Microcontroller 12 signals switch control logic 14 to cause switch 30 to couple voltage source 40 to top electrode 48 and switch 32 to couple ground 44 to bottom electrode 52.

In block 94, A/D convertor 18 samples voltage Vy and microcontroller 12 stores voltage Vy as data value Y−.

In block 96, microcontroller 12 compares the difference between data values X+ and X− with a predetermined threshold value Xthreshold. If the difference is greater than Xthreshold, then the sample values are invalid and the method branches back to block 72. Otherwise, the method continues in block 98.

Threshold value Xthreshold could be set to zero and block 96 would then compare data values X+ and X− to see if they were not equal. If data values X+ and X− were not equal, then the sample would be invalid and the operation would branch back to block 72. Otherwise, the method would continue to block 98.

In block 98, microcontroller 12 compares the difference between data values Y+ and Y− with a predetermined threshold value Ythreshold. If the difference is greater than Ythreshold, then the sample values are invalid and the method branches back to block 72. Otherwise, the method continues in block 100.

Threshold value Ythreshold could be set to zero and block 98 would then compare data values Y+ and Y− to see if they were not equal. If data values Y+ and Y− were not equal, then the sample would be invalid and the operation would branch back to block 72. Otherwise, the method would continue to block 100.

In block 100, the x-coordinate of the sampled point is calculated as the average of data values X+ and X−. If threshold value Xthreshold is zero, then the x coordinate is set equal to either data values X+ or X−.

In block 102, the y-coordinate of the sampled point is calculated as the average of data values Y+ and Y−. If threshold value Ythreshold is zero, then the y-coordinate is set equal to either data values Y+ or Y−. The method then returns to block 72.

Figure 3:
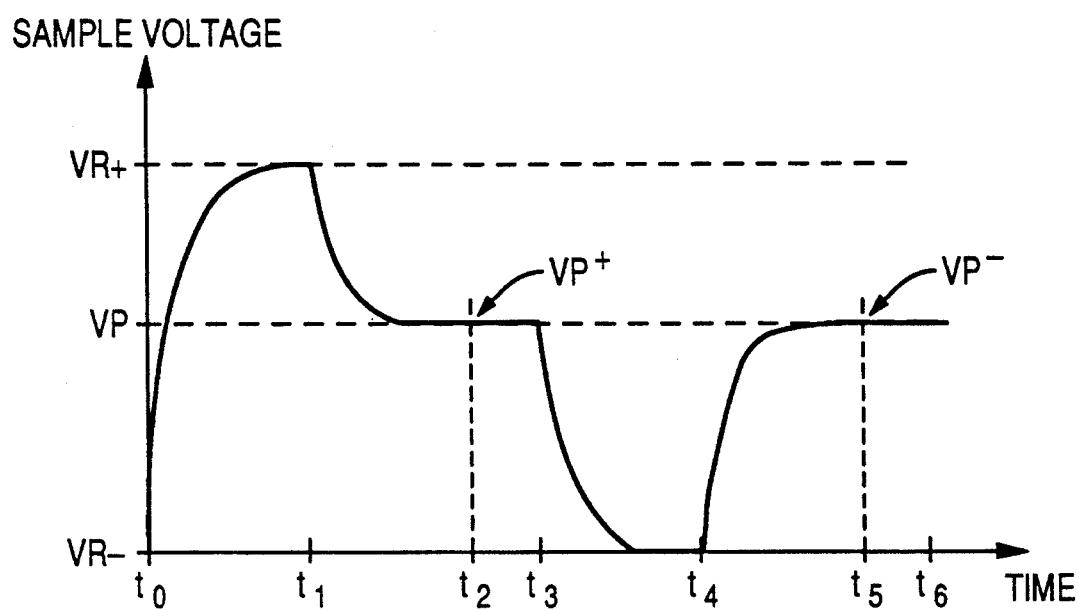
FIG. 3 is an analog voltage waveform for a valid point sample.

Referring now to FIG. 3, an analog waveform for a valid point sample, representative of either of voltages Vx or Vy, is shown.

At time t0, the sample circuitry starts charging towards the positive voltage rail VR+, as in blocks 72 and 84 of FIG. 2.

At time t1, the sample circuitry has charged to voltage rail VR+. The appropriate layer is driven, as in blocks 74 and 86 of FIG. 2. Where actuation force from a data input instrument is sufficient, the interlayer contact resistance is low enough for the sample circuitry to discharge before time t2 to the position voltage VP, which is defined as the driven layer voltage at the point of contact between upper and lower layers 22 and 24.

At time t2, the sample position voltage VP+ is taken, as in blocks 76 and 88.

At time t3, the sample circuitry starts discharging towards the negative voltage rail VR−, as in blocks 78 and 90 of FIG. 2.

At time t4, the sample circuitry has discharged to voltage rail VR−. The appropriate layer is driven, as in blocks 80 and 92 of FIG. 2. Where actuation force from a data input instrument is sufficient, the interlayer contact resistance is low enough for the sample circuitry to charge before time t5 to the position voltage.

At time t5, the sample position voltage VP− is taken, as in blocks 82 and 94.

In FIG. 3, the sampled point is valid because position voltages VP+ and VP− are equal.

Figure 4:
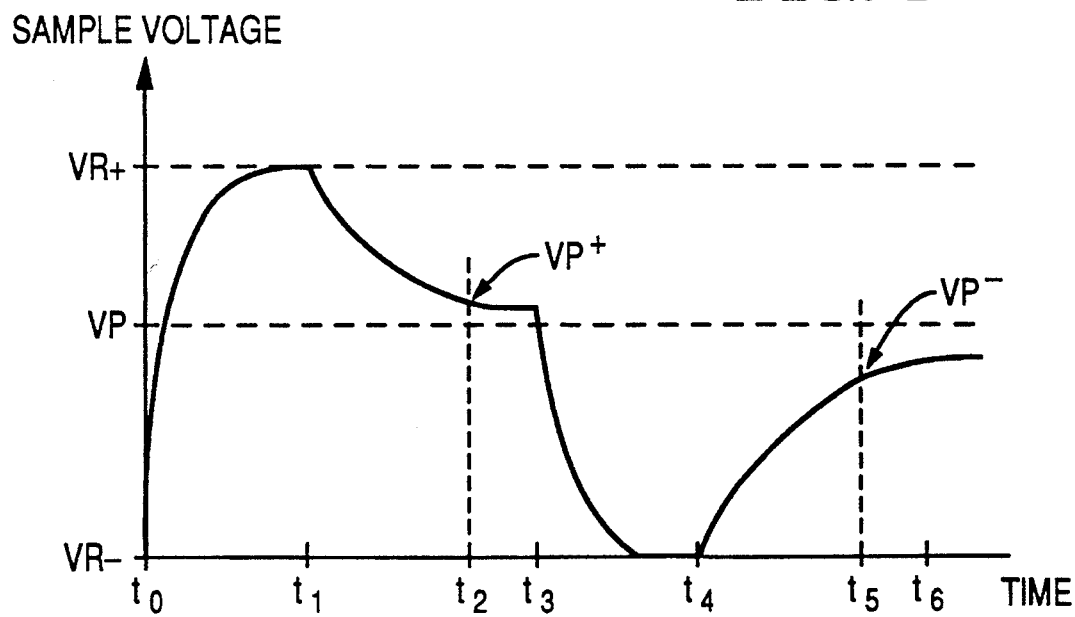
FIG. 4 is an analog voltage waveform for an invalid point sample.

Turning now to FIG. 4, an analog waveform for an invalid sample point is shown.

At time t0, the sample circuitry starts charging towards the positive voltage rail VR+, as in blocks 72 and 84 of FIG. 2.

At time t1, the sample circuitry has charged to voltage rail VR+. The appropriate layer is driven, as in blocks 74 and 86 of FIG. 2. Where actuation force from a data input instrument is insufficient, the interlayer contact resistance is too high for the sample circuitry to discharge before time t2 to the position voltage VP.

At time t2, the sample position voltage VP+ is taken, as in blocks 76 and 88.

At time t3, the sample circuitry starts discharging towards the negative voltage rail VR−, as in blocks 78 and 90 of FIG. 2.

At time t4, the sample circuitry has discharged to voltage rail VR−. The appropriate layer is driven, as in blocks 80 and 92 of FIG. 2. Where actuation force from a data input instrument is insufficient, the interlayer contact resistance is too high for the sample circuitry to charge before time t5 to the position voltage.

At time t5, the sample position voltage VP− is taken, as in blocks 82 and 94.

In FIG. 4, the sampled point is invalid because position voltages VP+ and VP− are not equal.

Although the present invention has been described with particular reference to certain preferred embodiments thereof, variations and modifications of the present invention can be effected within the spirit and scope of the following claims.

What is claimed is:

1. An apparatus for determining the validity of a point sampled from a digitizer having a plurality of electrodes and having inherent capacitive and resistive elements, the apparatus comprising:
   drive means for driving the digitizer and for charging and discharging the capacitive element;
   means for sensing charge and discharge voltages at a predetermined number of electrodes;
   control means coupled between the sensing means and the drive means for controlling the drive means, for determining the coordinates of the point, and for comparing the difference between the charge and discharge voltages at predetermined electrodes to a predetermined threshold to either accept the point or to reject the point due to insufficient writing force;
   wherein a difference greater than the predetermined threshold is indicative of insufficient writing force.

2. The apparatus as recited in claim 1, further comprising:
   filter means coupled between the sensing means and the digitizer and having capacitive and resistive elements for filtering signals from the digitizer; and
   selection means coupled to the drive means and controlled by the control means for connecting the drive means to the digitizer.

3. The apparatus as recited in claim 1, wherein the digitizer has a plurality of layers which are alternately coupled between the drive and sensing means.

4. The apparatus as recited in claim 2, wherein the drive means comprises:
   a voltage source coupled to one electrode on one layer by the selection means for charging the capacitive element; and
   a ground coupled to another electrode on the same layer by the selection means for discharging the capacitive element.

5. The apparatus as recited in claim 4, wherein the drive means further comprises:
   another voltage source coupled to the one electrode on another layer for driving the digitizer; and
   a ground for the voltage source coupled to another electrode on the same layer as the other electrode.

6. The apparatus as recited in claim 5, wherein the drive means further comprises:
   switching means controlled by the selection means for selectively coupling the one and the other voltage sources, and the one and the other grounds to the 7. The apparatus as recited in claim 2, wherein the selection means comprises a latch.

8. The apparatus as recited in claim 1, wherein the sensing means comprises an analog-to-digital convertor.

9. The apparatus as recited in claim 1, wherein the control means comprises a microcontroller.

10. The apparatus as recited in claim 2, wherein the digitizer has upper and lower resistive layers, and wherein the filter means comprises:
   a first filter between the upper layer and the sensing means; and
   a second filter between the lower layer and the sensing means.

11. An apparatus for determining the validity of a point sampled from a digitizer having a plurality of resistive layers, each layer containing a plurality of electrodes, the apparatus comprising:
   filter means having a capacitive element for filtering signals from the digitizer;
   drive means for driving the digitizer and for charging and discharging the capacitive element, including a first voltage source coupled to a first electrode on a first layer for charging the capacitive element, a first ground coupled to a second electrode on the first layer for discharging the capacitive element, a second voltage source coupled to a third electrode on a second layer for driving the digitizer, a second ground for the second voltage source coupled to a fourth electrode on the second layer, and switching means for selectively coupling the first and second voltage sources and the first and second grounds to the digitizer;
   selection means coupled to the drive means for connecting the drive means to the digitizer through the switching means, including a latch;
   an analog-to-digital convertor coupled to the filter means for sensing charge and discharge voltages at a predetermined number of electrodes;
   a microcontroller coupled between the sensing means and the selection means for controlling the selection means, for determining the coordinates of the point, and for comparing the difference between the charge and discharge voltages at predetermined electrodes to a predetermined threshold to either accept the point or to reject the point due to insufficient writing force;
   wherein a difference greater than the predetermined threshold is indicative of insufficient writing force.

12. A method for determining the validity of a point sampled from a digitizer having upper and lower resistive layers, each containing a plurality of electrodes, the method comprising the steps of:
   (a) charging a capacitive element within a first filter coupled to a first electrode within one layer of the digitizer to a first voltage;
   (b) driving the other layer at a first predetermined time;
   (c) sampling the voltage on the first electrode at a second predetermined time;
   (d) discharging the capacitive element to a second voltage;
   (e) driving the other layer at a third predetermined time;
   (f) sampling the voltage on the first electrode at a fourth predetermined time; and
   (g) comparing the difference between the sampled voltages to a predetermined threshold to accept the point or to reject the point due to insufficient writing force, wherein a difference greater than the predetermined threshold is indicative of insufficient writing force.

13. The method as recited in claim 12, wherein step a comprises the substeps of:
   (a-1) coupling a voltage source to the first electrode.

14. The method as recited in claim 12, wherein step b comprises the substeps of:
   (b-1) coupling a voltage source to a second electrode within the other layer of the digitizer; and
   (b-2) coupling a ground to a third electrode within the other layer.

15. The method as recited in claim 12, wherein step d comprises the substeps of:
   (d-1) coupling a ground to the first electrode.

16. The method as recited in claim 12, wherein step d comprises the substeps of:
   (d-1) coupling a ground to a fourth electrode on the one layer.

17. The method as recited in claim 12, wherein step e comprises the substeps of:
   (e-1) coupling a voltage source to a second electrode within the other layer of the digitizer; and
   (e-2) coupling a ground to a third electrode within the other layer.

18. An apparatus for determining the validity of a point sampled from a digitizer having a plurality of resistive layers, each layer containing a plurality of electrodes, the apparatus comprising:
   filter means having a capacitive element for filtering signals from the digitizer;
   drive means for driving the digitizer and for charging and discharging the capacitive element;
   selection means coupled to the drive means for connecting the drive means to the digitizer;
   means for sensing charge and discharge voltages at a predetermined number of electrodes;
   a microcontroller coupled between the sensing means and the selection means for controlling the selection means, for determining the coordinates of the point, and for comparing the difference between the charge and discharge voltages at predetermined electrodes to a predetermined threshold to either accept the point or to reject the point due to insufficient writing force;
   wherein a difference greater than the predetermined threshold is indicative of insufficient writing force.

* * * * *

UNITED STATES PATENT AND TRADEMARK OFFICE
CERTIFICATE OF CORRECTION

PATENT NO. : 5,225,636
DATED : July 6, 1993
INVENTOR(S) : Robert Protheroe

It is certified that error appears in the above-identified patent and that said Letters Patent is hereby corrected as shown below:

Column 6, line 61, after "the" insert --digitizer.--.

Signed and Sealed this

Seventh Day of June, 1994

Attest:

BRUCE LEHMAN

Attesting Officer    Commissioner of Patents and Trademarks